Sept. 18, 1934.    T. TOKUHISA    1,973,936
WHEEL POSITION INDICATOR
Filed May 31, 1933
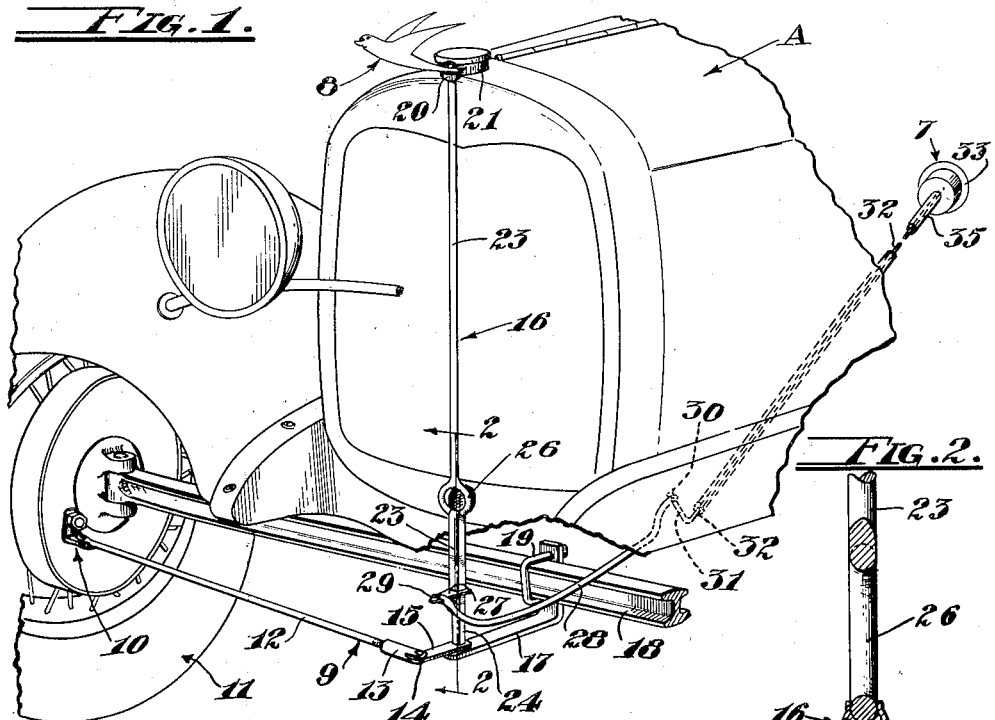
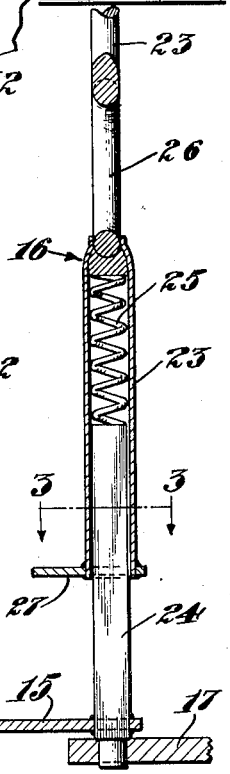
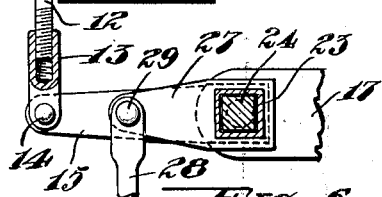
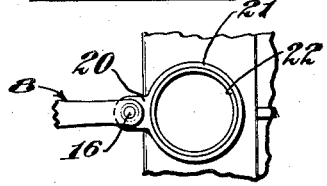
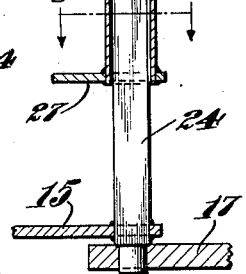
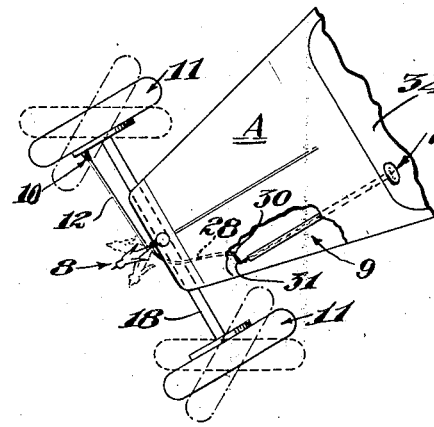
Inventor
Tokusaburo Tokuhisa
By Edward H. Kojima
Attorney Patented Sept. 18, 1934

1,973,936

UNITED STATES PATENT OFFICE 1,973,936

WHEEL POSITION INDICATOR

Tokusaburo Tokuhisa, Los Angeles, Calif.

Application May 31, 1933, Serial No. 673,581

1 Claim. (Cl. 116—31)

This invention relates in general to improvements in position indicators, and more particularly resides in the provision of a novel and efficient means for indicating to the driver of an automobile the position and angle of the front wheels at all times, but especially when the automobile is being, or is, parked, whereby to materially aid the driver in manipulating the car into and out of its parked position.

An object of the invention is to provide an indicator such as described, which is characterized by dual wheel-position indicating members, one of which is disposed on the instrument board and the other of which is mounted on the radiator, to serve also as an ornament therefor, said dual indicators insuring a readily discernible indication without distracting the driver.

A further object is to provide an indicator such as described which readily and easily lends itself to installation and is simple as to construction and comparatively inexpensive.

The invention possesses other objects and features of advantage, some of which, with the foregoing, will be set forth in the following description of the preferred form of the invention which is illustrated in the drawing accompanying the specification. It is to be understood, however, that variations in the showing made by the said drawing and description may be adopted within the scope of the invention as set forth in the claim.

Figure 1 is a fragmentary perspective view of an automobile as equipped with the indicator of this invention.

Figure 2 is a sectional view taken on the plane of line 2—2 of Figure 1.

Figure 3 is a sectional view taken on the plane of line 3—3 of Figure 2.

Figure 4 is a fragmentary plan view of the radiator cap, showing the means thereon for attaching the combined ornament and pointer member.

Figure 5 is a front elevation of the instrument board carried indicator.

Figure 6 is a fragmentary top plan view of an automobile showing the radiator carried indicator and the front wheels in various positions.

The present embodiment of the invention, as shown in detail on the accompanying drawing, is generally characterized by an instrument board carried wheel position indicator 7, and a radiator carried wheel position indicator 8, which operate in unison thru the instrumentality of mechanism 9, in turn actuated thru its pivot connection 10, with one of the front wheels 11 of the automobile A. It should be noted that an ordinary radiator cap ornament may be employed as the indicator 8, and that such indicator will point in the direction the front wheels are turned, as well as indicate the extent of such turning at a point substantially in the normal line of vision of the driver, whereby to appreciably aid the driver in manipulating the automobile. On the other hand, by having the indicator 7 on the instrument panel, when the driver operates the ignition key or starter, the said indicator falls within the normal vision range of the driver and reminds him of the wheel position as an aid in manipulation of the car.

Referring specifically to the invention, it is seen the mechanism 9 comprises a substantially horizontally positioned rod 12, one end is pivoted as at 10 to the wheel 11, as aforesaid, whereas the other end has an adjustable connector 13 pivoted as at 14 to a crank arm 15 fixed to a vertical shaft 16. This shaft is journaled at its lower end in a bracket 17 secured to the front axle 18 by a clamp 19. At its upper end the shaft 16 is journaled in an ear 20 which projects from a clamp fitted on the radiator neck 22.

The indicator 8, which in this instance is an ornamental figure of a bird in flight, is fixed to the upper end of the shaft 16 so as to turn therewith. With this arrangement it is seen that when the wheels 11 are turned, the rod 12 is moved and operates thru the crank arm 15 to turn the shaft 16, whereby the indicator 8 will be turned to indicate the position of the wheels. It should be noted that the indicator points straight ahead when the wheels are in straight ahead driving position, and that if the wheels are turned to the right or left, the indicator 8 will turn correspondingly and thereby accurately indicate the position of the wheels at all times.

To facilitate installation and to allow for vibrations and axle thrusts, the shaft 16 is comprised of two telescopically engaged sections 23 and 24, which are square in cross section where slidably engaged. The lower end of the upper shaft section 23 is tubular and houses a cushioning spring 25, which resists upward thrusts of the lower section 24. A ring portion 26 in the upper shaft section 23 permits of insertion of the engine crank (not shown) when necessary.

As a means for operating the instrument board carried indicator 7, the lower end of shaft section 23 is provided with a crank arm 27, to which a link 28 is pivoted as at 29. This link is also pivoted as at 30 to a crank arm 31 provided on a shaft 32 that extends to and operates the indicator 7. It should be noted that the housing 33 of the indicator is fastened to the instrument board 34, as shown in Figure 5, and that a tubular shaft housing 35 is fixed to housing 33 and surrounds the shaft 32, it being possible, though not here shown, to readily affix the shaft housing 35 to some adjacent part of the automobile, whereby to steady and effectively secure the operating mechanism in place.

The shaft 32 extends into the housing 34 thru an indicator panel 36, on which latter are suitable indicia, as shown, at 37. A needle or pointer 38 is fixed to the shaft 32 so as to point to said indicia as shown in Figure 5, whereby to indicate to the driver the positions of the front wheels.

It will now be apparent, with reference to the foregoing description and accompanying drawing, that when the wheels 11 are turned, the rod 12 will thru crank arm 15 rotate the shaft 16 and thereby actuate the indicator 8. Simultaneously with this operation the shaft 16 thru the crank arm 27, link 28 and crank arm 31 turns the shaft 32 and pointer 38 fixed on the latter whereby to operate the indicator 7. These two indicators will show the true position of the wheels 11 at all times, and, as herein before pointed out, will insure a ready and accurate discernment of the position of the wheels without necessitating that the driver's attention be diverted from proper manipulation of the automobile.

In the more modern cars the shaft 16 will extend behind the false front and be concealed instead of appearing in front of the radiator, as here shown. In all cases most of the other mechanism is concealed under the hood.

I claim:

In a wheel position indicator, an upright rotary shaft, means for supporting said shaft adjacent to the front of the radiator of an automobile, an indicating member connected with said shaft for turning movement therewith and disposed adjacent to the filling cap of said radiator, a crank arm on said shaft, a rod pivoted at one end to said crank arm, and means for pivotally connecting the other end of said rod to one of the front wheels of the automobile, another indicator adapted for mounting on the instrument board of the automobile, another crank arm on said shaft, a rotary shaft for operating said indicator, a crank arm on the second named shaft and a link pivoted to and between the two last named crank arms.

TOKUSABURO TOKUHISA.